United States Patent
Carey

[11] 3,920,430
[45] Nov. 18, 1975

[54] SUPPORT FOR BUSHING FOR CONTAINING MOLTEN MINERAL MATERIAL

[75] Inventor: Robert P. Carey, Columbus, Ohio

[73] Assignee: Owens-Corning Fiberglas Corporation, Toledo, Ohio

[22] Filed: Oct. 15, 1974

[21] Appl. No.: 514,524

Related U.S. Application Data

[63] Continuation of Ser. No. 404,472, Oct. 9, 1973, abandoned.

[52] U.S. Cl. .................... 65/1; 65/11 W; 65/11 R; 65/345; 65/374
[51] Int. Cl.² ........................................ C03B 37/02
[58] Field of Search .......... 248/317, 318, 312; 65/1, 65/2, 11 R, 11 W, 345, 374

[56] References Cited
UNITED STATES PATENTS

| | | | |
|---|---|---|---|
| 3,073,005 | 1/1963 | Tiede | 65/11 W X |
| 3,161,162 | 12/1964 | Homolya | 248/317 X |
| 3,264,076 | 8/1966 | Veazie et al. | 65/11 W X |
| 3,334,981 | 8/1967 | Glaser | 65/11 W X |
| 3,387,809 | 6/1968 | Zwerling | 248/317 X |
| 3,430,909 | 3/1969 | Webb | 248/317 |
| 3,558,091 | 1/1971 | Bush | 248/317 |

Primary Examiner—Robert L. Lindsay, Jr.
Attorney, Agent, or Firm—Carl G. Staelin; John W. Overman; Allen D. Gutchess, Jr.

[57] ABSTRACT

A support is provided for a bushing containing heat-softenable material from which fibers are attenuated through tips in the bottom wall of the bushing. Especially with larger bushings and those used to melt heat-softenable material requiring higher temperatures, the bushing bottoms tend to sag or creep over a period of time. To overcome this, a bushing is provided with a plurality of internal supports connected to the bottom and supporting the same against sag or creep. The supports can be in the form of tubes extending between side walls of the bushing with connecting members joining the tubes to the bushing bottom wall. In a preferred form, refractory rods are extended through the tubes for additional support.

16 Claims, 4 Drawing Figures

U.S. Patent Nov. 18, 1975 3,920,430
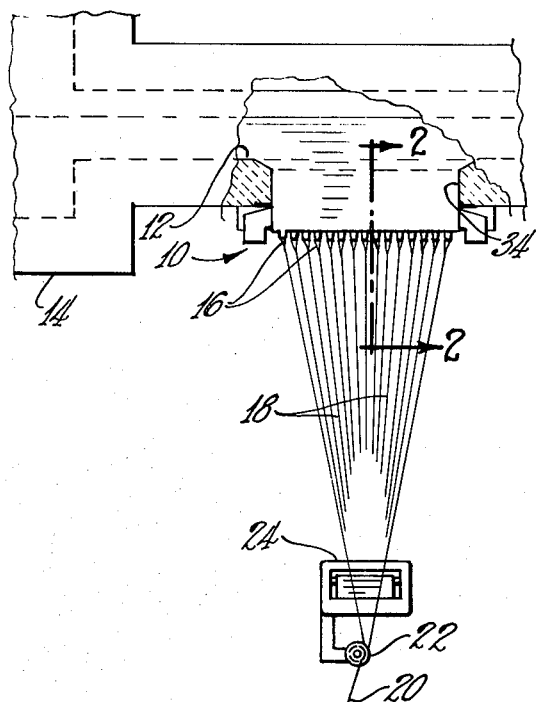
Fig.1
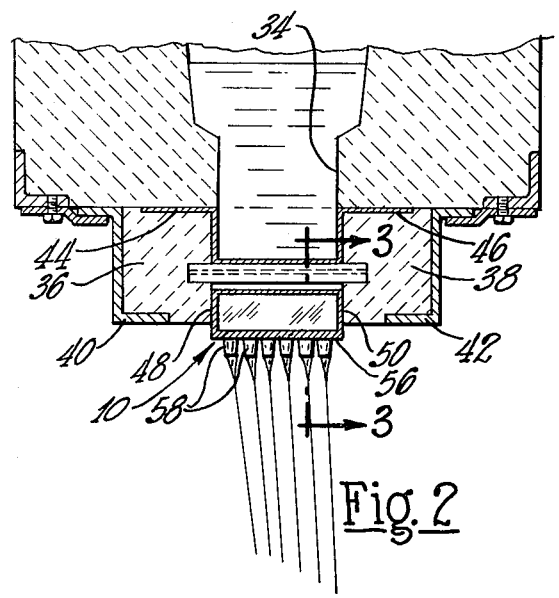
Fig.2
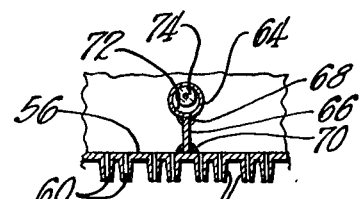
Fig.3
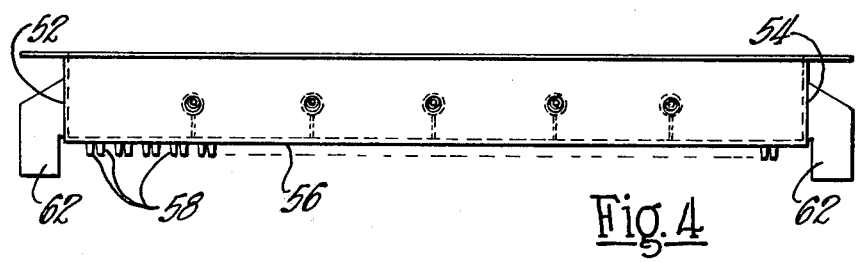
Fig.4
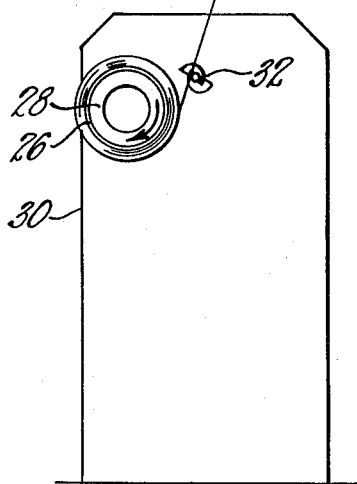

SUPPORT FOR BUSHING FOR CONTAINING MOLTEN MINERAL MATERIAL

This is a continuation, of application Ser. No. 404,472, filed Oct. 9, 1973 now abandoned.

This invention relates to supports for containers for heat-softenable material and more specifically to internal supports for bushings from which glass fibers are attenuated.

There has been a trend in recent years toward making textile glass filaments or fibers of smaller diameter, which smaller filaments have a number of advantages well recognized in the art. As the fiber diameter decreases, it is advantageous to attenuate more filaments from each bushing to maintain glass through-put of the bushing at reasonable rates. This has resulted in larger bushings with correspondingly larger tip sections or bottom walls to accommodate the larger number of tips from which the filaments are attenuated. The larger bottom walls are subjected to a greater overall load and tend to sag or creep sooner than bottom walls of smaller areas.

Also in recent years, there has been a need for filaments made of more highly refractory material so that such filaments can be used in environments at more highly elevated temperatures. Such filaments must be attenuated at higher temperatures with the heat-softenable material from which they are made correspondingly being softened or melted in the bushing at higher temperatures. Such temperatures have a marked tendency to cause the bushing bottom wall to sag or creep at even greater rates, depending upon the temperatures involved. This is true even though the bushing is made of the most high temperature resistant metal alloys known from which bushings can be fabricated.

Attempts have been made heretofore to overcome this problem of creep or sag through special bushing designs or through supports under the bushing bottoms. However, such attempts have met with limited success, often being ineffective to extend the bushing life appreciably without excessive creep or sag resulting. Such supports also have tended to interfere with the heat pattern of the bushing bottom or have physically interfered with the attenuation of fibers, resulting in a tendency to disrupt the fiber-forming operation. Still other attempts to reduce sag have required an excessive amount of the extremely expensive alloys of which the bushings are made.

The present invention provides an improved bushing support which is highly effective in preventing or greatly reducing sag or creep in a bushing bottom wall. The new support also does not interfere with the heat pattern of the bushing or otherwise interfere with the fiber-forming operation. The bushing support includes an elongate, internal member, preferably hollow, which extends between upright walls of the bushing, above the bottom wall thereof. Connecting members or plates are affixed to the elongated members and to the bushing bottom wall below these members. The elongate members preferably extend between opposite upright side walls transversely to the bushing bottom with the connecting members being affixed to the bushing bottom wall between the rows of bushing tips which extend downwardly therefrom. In a preferred form, rods of highly-refractory ceramic material extend through the hollow, elongate members and beyond the bushing upright walls to provide additional support.

It is, therefore, a principal object of the invention to provide an improved container for high-temperature, heat-softenable materials.

Another object of the invention is to provide a bushing from which fibers can be attenuated, which bushing has a longer effective life.

Still another object of the invention is to provide a bushing with a support for the bushing bottom wall which does not interfere with the fiber-forming operation.

A further object of the invention is to provide an internal support for a bushing extending between upright walls thereof and connected to the bushing bottom wall.

Yet a further object of the invention is to provide a bushing support which includes hollow elongate members extending between upright walls of the bushing above the bottom wall with means connecting the elongate members to transverse portions of the bottom wall, and with refractory rods extending through the hollow members.

Many other objects and advantages of the invention will be apparent from the following detailed description of a preferred embodiment thereof, reference being made to the accompanying drawings, in which:

FIG. 1 is a somewhat schematic view in elevation, with parts broken away and with parts in section, of overall apparatus for processing glass or other heat-softenable material into fine, continuous filaments;

FIG. 2 is a somewhat enlarged, schematic view in transverse cross section taken along the line 2—2 of FIG. 1;

FIG. 3 is a fragmentary view in cross section taken along the line 3—3 of FIG. 2; and FIG. 4 is a somewhat schematic side view in elevation of the bushing shown in FIGS. 1–3.

While the invention has particular utility in heat conditioning and processing heat-softenable glass for attenuation into fine, textile filaments, the invention also may be utilized for heat conditioning and processing other mineral materials at elevated temperatures in a container which is subjected to creep or sag.

Referring particularly to FIG. 1, a container and specifically a bushing 10 is arranged to be supplied with and contain heat-softenable material, such as glass, and especially glass suitable for attenuation into fine, continuous filaments suitable for textile uses.

The bushing 10 is located below and in communication with a forehearth 12 which receives refined, heat-softened or molten glass from a melting furnace 14. The bushing 10 may also be associated with other glass heating arrangements, including spheres or pieces of pre-refined glass melted in a region above the bushing at a rate at which the glass is withdrawn or attenuated from the bushing in a plurality of streams. Streams 16 of glass are attenuated into filaments 18 and are collected into a strand 20 by means of a gathering shoe 22 after a suitable binder or the like is applied to the individual filaments 18 by an applicator 24. The strand 20 is then wound upon a tube or sleeve 26 mounted on a mandrel 28 and driven by suitable drive means in a winding machine housing 30. The strand 20 is traversed lengthwise of the tube 26 by a level wind device 32, as is known in the art.

The bushing 10 is mounted in communication with an opening 34 in the bottom of the forehearth 12. More specifically, the bushing 10 is mounted in castable refractory bodies 36 and 38 which are supported by frames 40 and 42 suitably affixed to the forehearth supporting structure. In this instance, the bushing 10 has horizontally extending flanges 44 and 46 which are located between the castable bodies 36 and 38 and the refractory of the forehearth 12 forming the opening 34. Upright side walls 48 and 50 and upright end walls 52 and 54 extend downwardly from the horizontal flanges and terminate at their lower edges in a bottom wall or tip section 56. A multiplicity of fiber-forming tips 58 extend downwardly from the tip section 56 and have suitable orifices or passages 60 (FIG. 3) formed therein through which heat-softened material is attenuated into the filaments 18. The bushing 10 is heated by current supplied to the walls of the bushing through terminals 62 (FIG. 4) located at the ends thereof, as is known in the art.

When the bushing is in operation for a period of time, the bottom wall or tip section 56 tends to creep or sag, particularly in the center, even when made of the highest temperature resistant alloys of platinum and rhodium known in the art. Other alloys exist which are capable of withstanding higher temperatures for longer periods of time but such alloys are otherwise unsuitable for use in bushings, such as the bushing 10. These alloys lack certain desirable characteristics, such as the capability of being fabricated into a bushing, have undesirable electrical characteristics, or are too costly.

The length of the life of the bushing 10 when a given alloy is used is influenced by the size of the bottom wall 56, the thickness of it, and the temperature of operation. With the larger number of the tips 58 employed in the making of the finer filaments 18, the area of the bottom wall 56 is larger and the life is correspondingly reduced. While the bottom wall 56 could be made thicker to increase the life and reduce creep or sag, the increased thickness has a deleterious effect upon the temperature pattern of the bushing as influenced by the pattern of the current flowing from one of the terminals 62 to the other. The increased thickness also has an effect upon the fiber-forming operation due to a change in the physical size of the passages 60 and also tends to add considerably to the cost of the bushing due to the increased amount of the metal employed therein. The operating temperature has a very substantial influence on the life of the bushing with higher temperatures substantially reducing life. For example, a bushing operated at a temperature of 2200°F. to produce a given type fiber heretofore had an expected life in the order of nine months before excess sagging occurred. A similar bushing operated at a temperature of 2500°F. to produce special high-temperature fibers for special purposes had an expected life in the order of only 6 hours before excess sagging occurred.

In accordance with the invention, the bushing tip section or bottom wall 56 is supported, preferably internally, at spaced points to greatly reduce sag and to substantially extend the life of the bushing. The bushing is supported in a manner such that the support does not interfere with the heat pattern of the bushing nor does it interfere with the fiber-forming operation in any manner. Accordingly, a plurality of elongate, high temperature-resistant, metal members, preferably hollow and in the form of tubes 64, extend between the upright walls 48–54 and specifically between the side walls 48 and 50, as shown. Connecting means extend between the elongate members 64 and the bottom wall 56, being shown in the form of gussets or plates 66 which are affixed to both the lower surface of the elongate members 64 and the upper surface of the bottom wall 56. The plates 66 can be affixed, as by welding, either continuously or in intermittent lengths to the tubes 64, as indicated at 68. The plates 66 preferably are welded to the bottom wall 56 only in intermittent, short lengths, indicated at 70. Soley by way of further illustration, the tubes 64 can be in the order of 9/32 inch in diameter with a wall thickness of 0.030 inch while the plates 66 are about ½ inch or so high, 0.020 inch thick, and are long enough to extend substantially between the upright walls 48 and 50.

As shown in FIG. 2, each of the elongate members 64 is open at both of the walls 48 and 50 to provide a passage 72 which receives an elongate refractory member or rod 74 which can be of ceramic material such as alumina. The rods 74 can be 7/32 inch in diameter and ¼ inch or so longer than the tubes 64. The length of the rod exceeds the distance between the upright walls 48 and 50 so that the rod 74 extends into both of the castable bodies 36 and 38 for support, the castable material being poured while the rods are held in place. The diameter of the passage 72 preferably exceeds the diameter of the rod 74 but with the upper surface of the rod 74 bearing against the upper inner surface of the passage 72, whereby the rod fully supports the hollow member without having to be closely fit to the diameter of the passage 72 and substantially prevents any tendency for the member 64 to sag. The member 64 provides support for the plate 66 which, in turn, provides transverse support for the bottom wall 56, greatly reducing sag and increasing dimensional stability.

As shown in FIG. 4, preferably a plurality of the transverse supports are supplied for the lower or bottom wall 56, with the supports typically being spaced apart about two inches along the longitudinal extent of the bushing. The spacing of the supports, of course, depends on many factors, including the length and width of the bushing, the operating temperatures, and the physical nature of the bottom wall 56.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. A bushing for containing molten mineral material from which fibers can be attenuated, said bushing comprising upright walls and a bottom wall extending between said upright walls, said bottom wall having a plurality of orifices through which molten mineral material can flow for attenuation into fibers, and supporting means connected to said bottom wall to provide support for said bottom wall in order to increase the dimensional stability thereof and reduce creep or sag over a period of time, said supporting means comprising an elongate member extending between two upright walls above said bottom wall, and means connecting said elongate member to said bottom wall.

2. A bushing according to claim 1 characterized by said supporting means comprises tubular metal members extending through the interior of the bushing.

3. A bushing according to claim 2 characterized by a ceramic rod extending through each of said tubular members and beyond the corresponding upright walls.

4. A bushing for containing molten mineral material and for heat softening the material until fibers can be attenuated therefrom, said bushing comprising upright walls and a bottom wall connecting said upright walls, said bottom wall having a plurality of orifices through which molten mineral material can flow for attenuation into fibers, means for supplying current through said walls to heat the same, said upright and bottom walls being made of a high-temperature resistant metal, internal supporting means connected to said bottom wall at spaced longitudinal portions thereof to provide support for said bottom wall in order to increase the dimensional stability thereof and reduce creep or sag over a period of time, said supporting means comprising a plurality of elongate members positioned transversely of said bottom wall and spaced therealong, and connecting means affixed to said elongate members and to spaced transversely-extending portions of said bottom wall.

5. A bushing according to claim 4 wherein said elongate members are hollow.

6. A bushing according to claim 5 characterized by a rod extending through each of said elongate hollow members.

7. A bushing according to claim 6 characterized by said refractory rod extending beyond both ends of each of said elongate hollow members.

8. A bushing according to claim 7 characterized by castable refractory material embedding both ends of said rod beyond each of said elongate hollow members.

9. A bushing according to claim 6 characterized by said rods being made of a ceramic material.

10. A bushing for containing heat-softenable glass from which fibers can be attenuated, said bushing comprising upright walls and a bottom wall extending between said upright walls, said bottom wall having a plurality of orifices through which glass can flow for attenuation into fibers, means for heating said bushing, and supporting means connected to said bottom wall to provide support for said bottom wall in order to increase the dimensional stability thereof and reduce creep or sag over a period of time, said supporting means comprising an elongate, tubular member located in supporting relationship with respect to said bottom wall, connecting means affixed to said tubular member and said bottom wall, and refractory means located in said tubular member and effective to aid in supporting same.

11. A bushing according to claim 10 characterized by said refractory means extends substantially the full length of said tubular member.

12. A bushing accordinng to claim 10 wherein said refractory means is a refractory rod.

13. A bushing according to claim 12 wherein said refractory rod comprises alumina.

14. A bushing according to claim 12 characterized by said refractory rod extends beyond both ends of said tubular member.

15. A bushing according to claim 14 characterized by means for supporting both ends of said refractory rod.

16. A container according to claim 15 characterized by said supporting means being castable refractory material embedding the ends of said rod.

* * * * *